United States Patent [19]
Welles, II et al.

[11] Patent Number: 5,608,412
[45] Date of Patent: Mar. 4, 1997

[54] PROTOCOL AND MECHANISM FOR MUTTER MODE COMMUNICATION FOR STATIONARY MASTER TRACKING UNIT

[75] Inventors: Kenneth B. Welles, II, Scotia; Irfan Ali, Niskayuna; Daniel D. Harrison, Delanson, all of N.Y.

[73] Assignee: General Electric Company, Schenectady, N.Y.

[21] Appl. No.: 484,751

[22] Filed: Jun. 7, 1995

[51] Int. Cl.$^6$ ................................................. G01S 3/02
[52] U.S. Cl. ..................... 342/457; 342/463; 455/53.1
[58] Field of Search ............................ 342/457, 463; 364/449; 455/53.1

[56] References Cited

U.S. PATENT DOCUMENTS

| | | | |
|---|---|---|---|
| 4,682,326 | 7/1987 | Ulug | 370/89 |
| 4,845,504 | 7/1989 | Roberts et al. | 342/457 |
| 4,884,208 | 11/1989 | Marinelli et al. | 364/460 |
| 5,225,842 | 7/1993 | Brown et al. | 342/357 |
| 5,296,861 | 3/1994 | Knight | 342/357 |
| 5,319,374 | 6/1994 | Desai et al. | 342/387 |
| 5,355,511 | 10/1994 | Hatano et al. | 455/11.1 |
| 5,365,516 | 11/1994 | Jandrell | 342/457 |
| 5,379,224 | 1/1995 | Brown et al. | 364/449 |

FOREIGN PATENT DOCUMENTS 09415413  7/1994  European Pat. Off.

*Primary Examiner*—Theodore M. Blum
*Attorney, Agent, or Firm*—Marvin Snyder

[57] ABSTRACT

A local area network (LAN) of tracked mobile assets which are temporarily located in an area having a high density of mobile assets, such as a railway yard, employs a stationary master tracking unit that is responsible for communicating with mobile tracking units affixed to the mobile assets and transmitting information to a central station. The stationary master tracking unit may be mounted at an elevation, as on a pole, and single or multiple stationary master tracking units may exist in the same vicinity. Each stationary master tracking unit has a constant supply of power and communicates with the central station by way of either satellites or dedicated land line connection. A protocol is provided for communicating between the Stationary master tracking unit and the mobile tracking units. The protocol provides a mechanism for acquiring new mobile tracking units entering the railway yard and a mechanism for releasing mobile tracking units leaving the railway yard.

7 Claims, 6 Drawing Sheets

PROTOCOL AND MECHANISM FOR MUTTER MODE COMMUNICATION FOR STATIONARY MASTER TRACKING UNIT

BACKGROUND OF THE INVENTION

1. Field of the Invention

This present invention relates to asset tracking and, more particularly, to the tracking of assets that are temporarily stationary, including goods and vehicles, using the Global Positioning System (GPS). While goods are an example of assets that need to be tracked, the containers, container trucks and railcars in which the goods are shipped are themselves assets which need to be tracked.

2. Background Description

Goods shipped from a manufacturing plant, warehouse or port of entry to a destination are normally tracked to assure their timely and safe delivery. Tracking has heretofore been accomplished in part by use of shipping documents and negotiable instruments, some of which travel with the goods and others of which are transmitted by post or courier to a receiving destination. This paper tracking provides a record which is completed only on the safe delivery and acceptance of the goods; however, during transit, there sometimes is a need to know the location of the goods. Knowledge of the location of the goods can be used for inventory control, scheduling and monitoring.

Shippers have provided information on the location of goods by tracking their vehicles, knowing what goods are loaded on those vehicles. Goods are often loaded aboard shipping containers or container tracks, for example, which are in turn loaded aboard railcars. Various devices have been used to track such vehicles. In the case of railcars, passive radio frequency (RF) transponders mounted on the cars have been used to facilitate interrogation of each car as it passes a way station and supply the car's identification. This information is then transmitted by a radiated signal or land line to a central station which tracks the locations of cars. This technique, however, is deficient in that while a particular railcar remains on a siding for an extended period of time, it does not pass a way station. Moreover, way station installations are expensive, requiting a compromise that results in way stations being installed at varying distances, depending on the track layout. Thus, the precision of location information varies from place to place on the railroad.

Recently, mobile tracking units have been used for tracking various types of vehicles, such as trains. Communication has been provided by means of cellular mobile telephone or RF radio link. Such mobile tracking units are generally installed aboard the locomotive which provides a ready source of power. However, in the case of shipping containers, container truck trailers and railcars, a similar source of power is not readily available. Mobile tracking units which might be attached to containers and vehicles must be power efficient in order to provide reliable and economical operation. Typically, a mobile tracking unit includes a navigation set, such as a Global Positioning System (GPS) receiver or other suitable navigation set, responsive to navigation signals transmitted by a set of navigation stations which may be either space-based or earth-based. In each case, the navigation set is capable of providing data indicative of the vehicle location based on the navigation signals. In addition, the tracking unit may include a suitable electromagnetic emitter for transmitting to a remote location the vehicle's location data and other data acquired from sensing elements on board the vehicle. Current methods of asset localization require that each item tracked be individually equipped with hardware which determines and reports location to a central station. In this way, a tracked asset is completely "ignorant" of other assets being shipped or their possible relation to itself. In reporting to the central station, such system requires a bandwidth which scales approximately with the number of assets being reported. The aggregate power consumption over an entire such system also scales with the number of assets tracked. Further, since both the navigation set and the emitter are devices which, when energized, generally require a large portion of the overall electrical power consumed by the mobile tracking unit, it is desirable to control the respective rates at which such devices are respectively activated and limit their respective duty cycles so as to minimize the overall power consumption of the mobile tracking unit.

Most present-day asset tracking systems are land-based systems wherein a radio unit on the asset transmits information to wayside stations of a fixed network, such as the public land mobile radio network or a cellular network. These networks do not have ubiquitous coverage, and the asset tracking units are expensive. A satellite-based truck tracking system developed by Qualcomm Inc., known as OMNITRACS is in operation in the United States and Canada. This system requires a specialized directional antenna and considerable power for operation, while vehicle location, derived from two satellites, is obtained to an accuracy of about one-fourth kilometer. U.S. Pat. No. 5,129,605 to Burns et al. describes a rail vehicle positioning system for installation on the locomotive of a train and which, to provide input signals for generating a location report, uses a GPS receiver, a wheel tachometer, transponders, and manual inputs from the locomotive engineer.

In an asset tracking system disclosed in U.S. application Ser. No. 08/484,750 entitled "Local Communication Network for Power Reduction and Enhanced Reliability in a Multiple Node Tracking System" by Welles et al. and in U.S. application Ser. No. 08/487,272, entitled "Protocol and Mechanism for Primary and Mutter Mode Communication for Asset Tracking" by Ali et al. both applications filed concurrently herewith, assigned to the instant assignee and incorporated herein by reference, a tracking system based on a "mutter" mode local area network is used to generate data which are transmitted to a central station. In this asset tracking system, there are two modes of communication. One mode is communication between the central station and the tracking units, which is usually via satellite. The second mode is a local area network, referred to as the "mutter" mode, between tracking units. One of the tracking units, denoted the master unit, communicates with the central station.

SUMMARY OF THE INVENTION

An object of the present invention is to provide a local area network of tracked assets when those assets are temporarily stationary for a period of time, such as railcars in a railway yard.

According to the present invention, a dedicated stationary master tracking unit is responsible for communicating with mobile tracking units and transmitting information to the central station. The dedicated stationary master unit will, in most cases, be mounted at an elevation, e.g., on a pole, and will be located at places of high mobile tracking unit densities, such as a railway yard. Single or multiple stationary master tracking units may exist in the same vicinity. The stationary master units have a constant supply of power and communicate with the central station either through satellite or through a dedicated land line connection.

This invention provides a protocol for communicating between the stationary master unit and the mobile tracking units. The protocol constitutes a mechanism for acquiring new mobile tracking units entering the railway yard and a mechanism for releasing mobile tracking units leaving the railway yard. The protocol reduces power consumed by the mobile tracking units for the following reasons:

1. The mobile tracking units do not have to communicate to the central station. They communicate via the mutter mode to the stationary master which communicates with the central station. Also, commands from the central station are relayed to the mobile tracking units via the stationary master tracking unit.
2. The mobile tracking units do not have to perform GPS position determination. The location of the mobile tracking units is tracked by being in the vicinity of the stationary master tracking unit.
3. Using an efficient mutter mode communication protocol puts the burden of power consumption on the stationary master tracking unit rather than on the mobile tracking units.
4. Use of high bandwidth for mutter mode communication reduces the time for which the mobile tracking unit has to stay "ON" to receive or transmit information.

The protocol also supports all modes of mobile tracking unit operation which includes pre-assigned data reporting, by which the mobile tracking units send reports at predetermined intervals, reporting of sensor triggered alarms, and polled request for data and operational mode changes of the mobile tracking unit.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF A PREFERRED EMBODIMENT OF THE INVENTION

Figure 1:
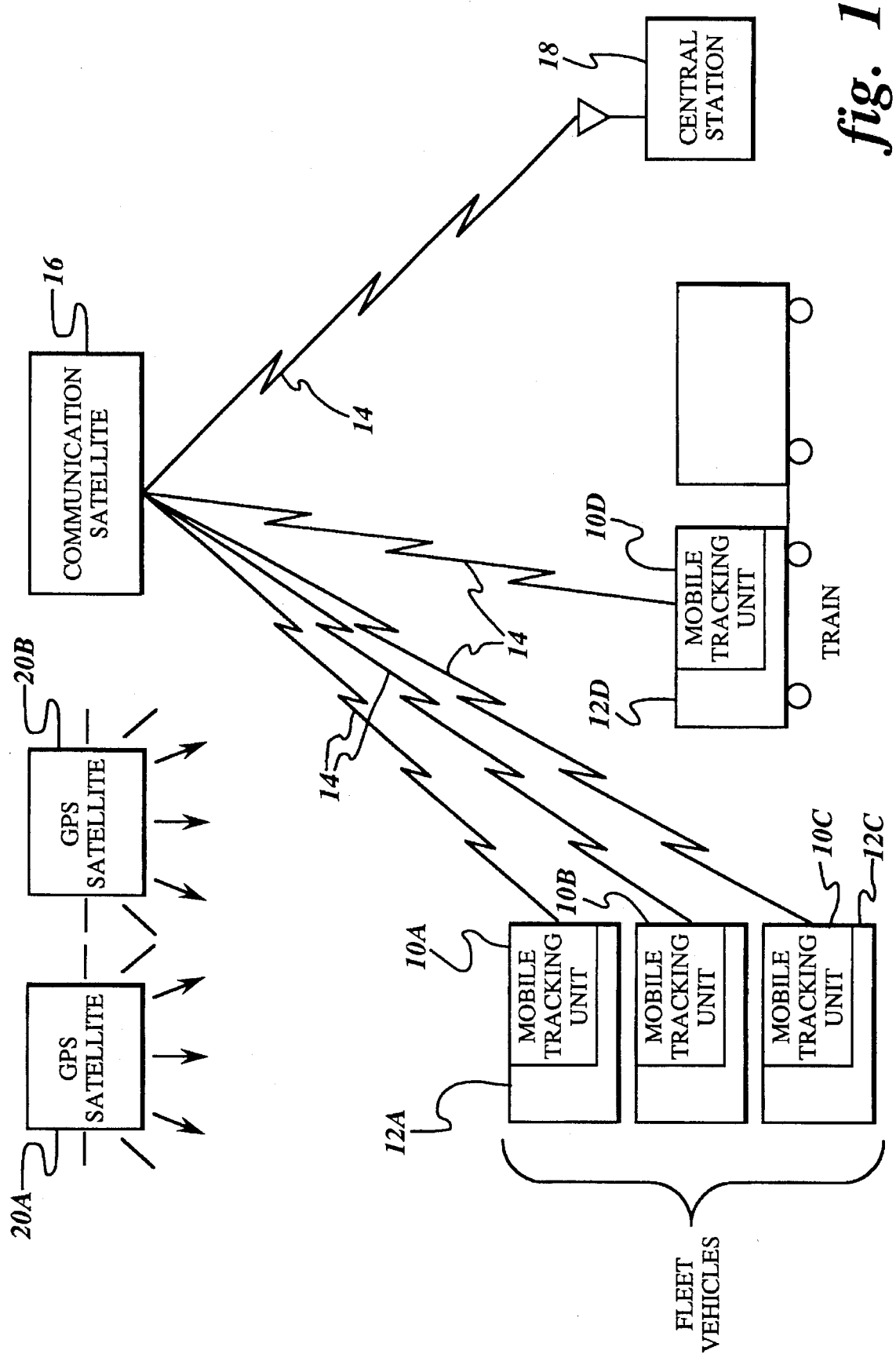
FIG. 1 is a block diagram of an exemplary asset tracking system which employs mobile tracking units and operates in accordance with the method of the present invention.

FIG. 1 illustrates mobile tracking units which employ navigation signals from a GPS satellite constellation, although, as suggested above, other navigation systems can be used in lieu of GPS. A set of mobile tracking units 10A–10D which are installed in respective vehicles 12A–12D are to be tracked or monitored. A communication link 14, such as a satellite communication link through a communication satellite 16, can be provided between each mobile tracking unit (hereinafter collectively designated 10) and a central station 18 manned by one or more operators and having suitable display devices and the like for displaying location and status information for each vehicle equipped with a respective mobile tracking unit. Communication link 14 can be conveniently used for transmitting vehicle conditions or events measured with suitable sensing elements. Communication link 14 may be one-way (from mobile tracking units to remote control station) or two-way. In a two-way communication link, messages and commands can be sent to the tracking units, thereby further enhancing reliability of the communication. A constellation of GPS satellites, such as GPS satellites 20A and 20B, provides highly accurate navigation signals which can be used to determine vehicle location and velocity when the signals are acquired by a suitable GPS receiver.

Briefly, the GPS was developed by the U.S. Department of Defense and gradually placed into service throughout the 1980s. The GPS satellites constantly transmit radio signals in L-Band frequency using spread spectrum techniques. The transmitted radio signals carry pseudorandom sequences which allow users to determine location on the surface of the earth (within approximately 100 feet), velocity (within about 0.1 MPH), and precise time information. GPS is a particularly attractive navigation system to employ, being that the respective orbits of the GPS satellites are chosen so as to provide world-wide coverage and being that such highly-accurate radio signals are provided free of charge to users by the U.S. government.

Figure 2:
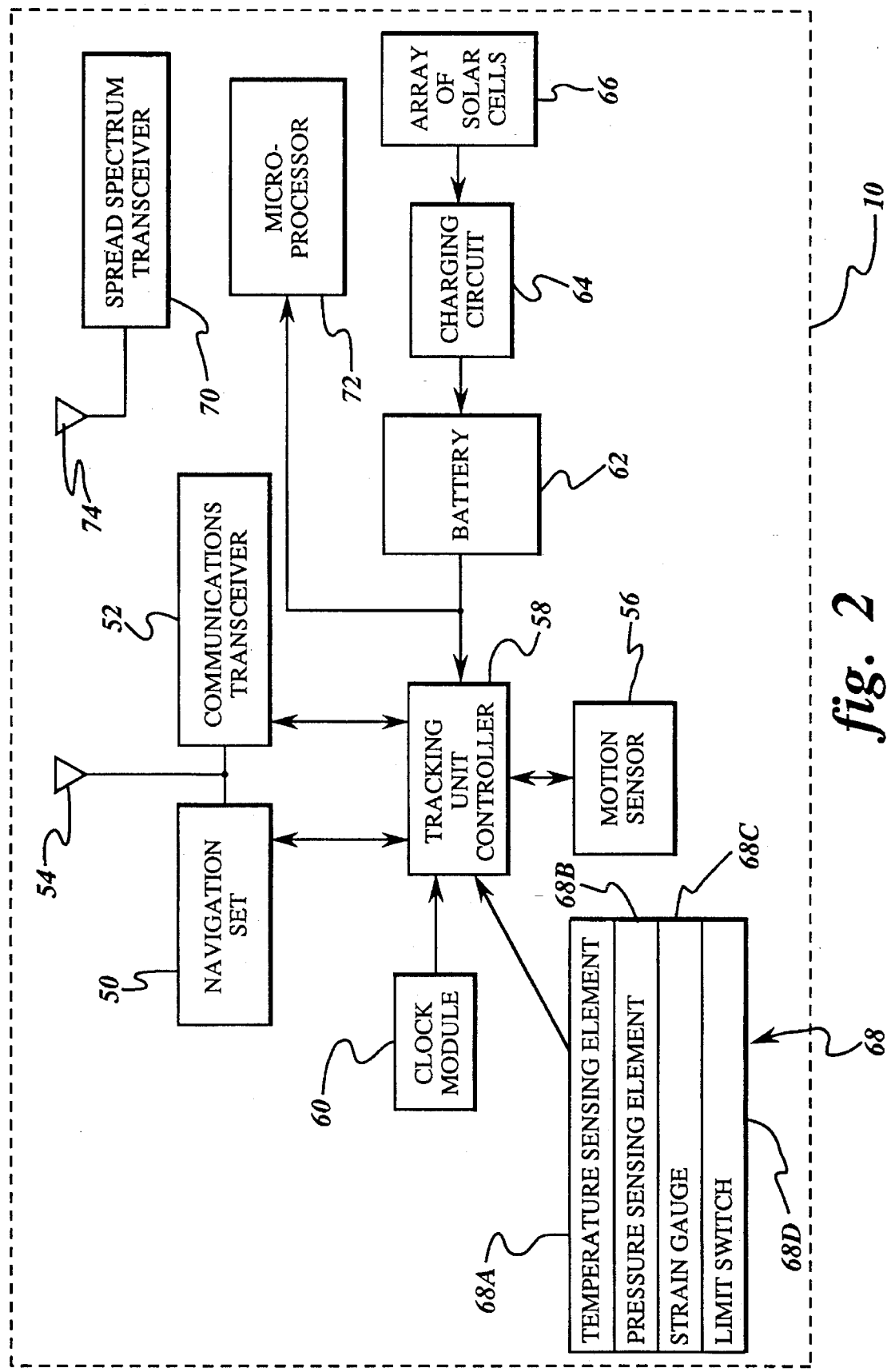
FIG. 2 is a block diagram showing in further detail a mobile tracking unit as used in the asset tracking system shown in FIG. 1.

FIG. 2 shows a mobile tracking unit 10 which includes a navigation set 50 capable of generating data substantially corresponding to the vehicle location. Choice of navigation set depends on the particular navigation system used for supplying navigation signals to the mobile tracking unit. Preferably, the navigation set is a GPS receiver such as a multichannel receiver; however, other receivers designed for acquiring signals from a corresponding navigation system may alternatively be employed. For example, depending on the vehicle location accuracy requirements, the navigation set may comprise a Loran-C receiver or other such less highly-accurate navigation receiver than a GPS receiver. Further, the navigation set may conveniently comprise a transceiver that inherently provides two-way communication with the central station and avoids the need for separately operating an additional component to implement such two-way communication. Briefly, such transceiver would allow for implementation of satellite range measurement techniques whereby the location of the vehicle is simply determined at the central station by range measurements to the vehicle and the central station from two satellites whose position in space is known. In each case, the power consumed by the navigation set imposes a severe constraint for reliable and economical-operation of the mobile tracking unit in vehicles which do not have power supplies, such as shipping containers, railcars used for carrying cargo and the like. For example, typical present-day GPS receivers generally require as much as two watts of electrical power. In order for the GPS receiver to provide a location fix, the GPS receiver must be energized for some minimum period of time in order to acquire sufficient signal information from a given set of GPS satellites to generate a navigation solution.

A key advantage of the present invention is the ability to substantially reduce the energy required by the mobile tracking unit by selectively reducing the activation or usage rate for the navigation set and other components of the mobile tracking unit. In particular if, during times when the vehicle is stationary, the activation rate for the navigation set is reduced, then the energy required by the mobile tracking unit can be substantially reduced, for example, by a factor of at least about one hundred.

Mobile tracking unit 10 also includes a communications transceiver 52 functionally independent from navigation set 50. If the navigation set comprises a transceiver, then the function of transceiver 52 can be perforated by the transceiver of navigation set 50. Both transceiver 52 and navigation set 50 are actuated by a controller 58 which, in turn, is responsive to signals from a clock module 60. Transceiver 52 is capable of transmitting the vehicle location data by way of communication link 14 (FIG. 1) to the central station and receiving commands from the central station by way of the same link. If a GPS receiver is used, the GPS receiver and the transceiver can be conveniently integrated as a single unit for maximizing efficiency of installation and operation. An example of one such integrated unit is the Galaxy InmarsatC/GPS integrated unit, which is available from Trimble Navigation, Sunnyvale, Calif., and is conveniently designed for data communication and position reporting between the central station and the mobile tracking unit. A single, low profile antenna 54 can be conveniently used for both GPS signal acquisition and satellite communication.

A low power, short distance radio link permits joining the nearby mobile tracking units in a network to conserve power and maintain high reliability and functionality of such network. As shown in FIG. 2, in addition to a power source 62 (which comprises a battery pack that can be charged by an array of solar cells 66 through a charging circuit 64), a GPS receiver 50, a communications transceiver 52, and various system and vehicle sensors 68A–68D, each tracking unit includes a low power local transceiver 70 and a microprocessor 72. Microprocessor 72 is interfaced to all of the other elements of the tracking unit and has control over them. Transceiver 70 may be a commercially available spread spectrum transceiver such as those currently utilized in wireless local area networks. Spread spectrum transceiver 70 is equipped with its own low profile antenna 74.

Figure 3:
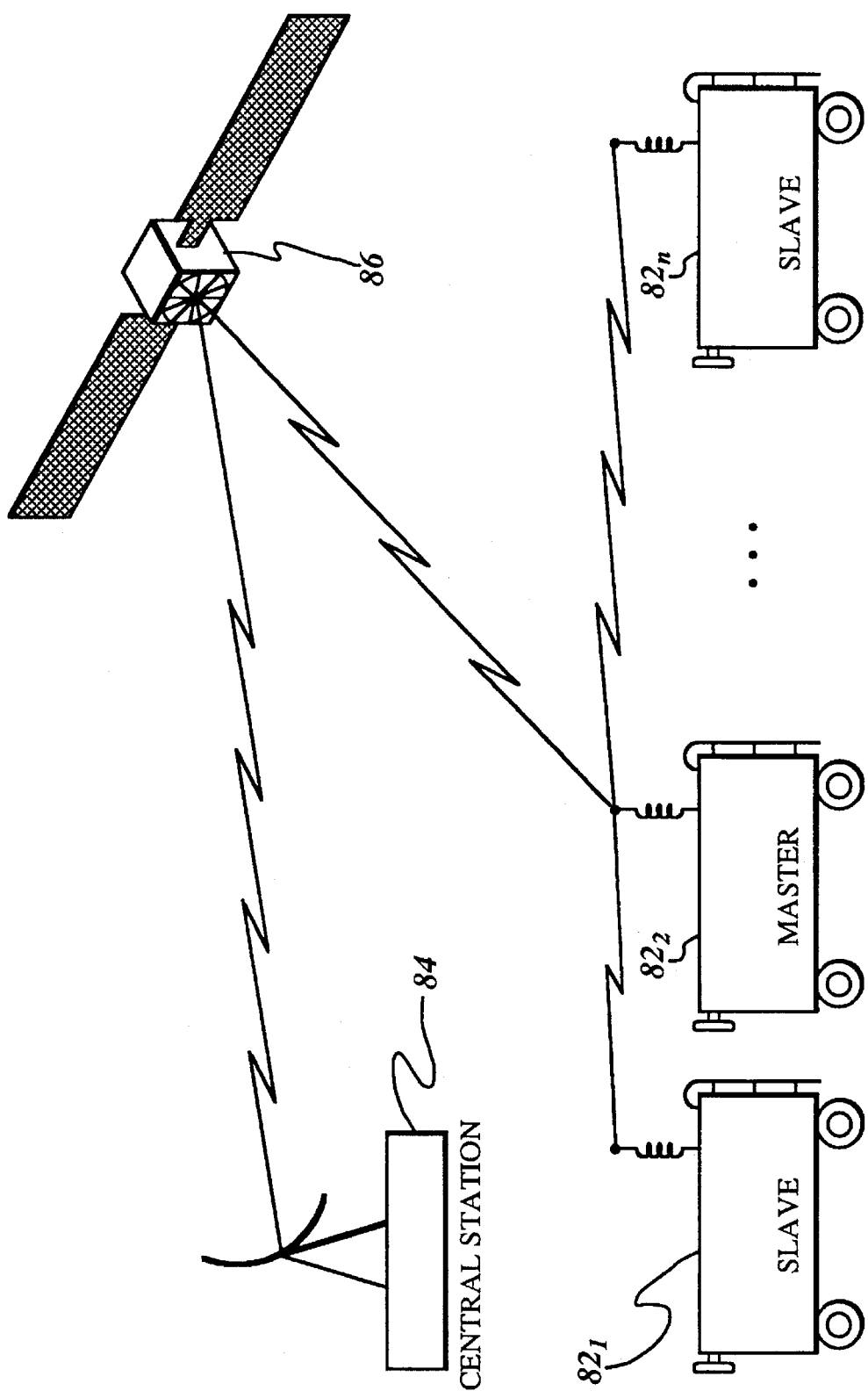
FIG. 3 is a block diagram illustrating organization of the mobile local area network implemented by the present invention.

Utilizing local transceiver 70, microprocessor 72 communicates with all other tracking units within communications range, forming a dynamically configured local area network (LAN), heroin after called a "mutter network". Such mutter network is generally shown in FIG. 3. When a train includes multiple freight cars $82_1$, $82_2$, ..., 82n equipped with these tracking units as indicated in FIG. 3, all of these units will exchange information. Because each microprocessor is interfaced to its own power sources, respectively, the status of available power for each tracking unit can also be exchanged. Once this information is available, then the unit with the most available power (i.e., most fully charged batteries) will become the designated master, the other tracking units being slaves. The master tracking unit performs the GPS location and velocity reception function, assembles these data along with the identification (IDs) of all other tracking units on the train, and transmits this information periodically in a single packet to a central station 84 via communication satellite 86.

Because one GPS receiver among all of the tracking units is turned on at a time (as well as only one communications transceiver), the overall system power consumption is minimized. Moreover any unit with weak batteries will not perform the GPS receiving or information transmitting and command receiving functions, which are the most power-consuming functions in the tracking unit. This function also increases the reliability of each tracking unit because it automatically reduces power consumed by a tracking unit which has a degraded or partially functional power source. Thus, a tracking unit with damaged solar cells or a battery which can not hold a full charge can still be fully functional when it is part of a train with fully functional tracking units.

The GPS receiver, the satellite transceiver and their antennae are major, complex modules in the tracking unit. A failure of any of these modules could render the tracking unit inoperative if no alternative communication system existed; however, using the low power spread spectrum transceiver 70 shown in the block diagram of FIG. 2 allows a tracking unit with such module malfunction to operate when it is part of a train with fully operational tracking units. An additional reliability feature is that the malfunctioning unit can report its faulty status along with its location, so that repairs can be scheduled.

An additional reliability feature allows a malfunctioning module that is not part of a train containing an operational tracking unit to still be located. A solitary rail car with a malfunctioning tracking unit (or a malfunctioning unit which is the only tracking unit on a train) will "listen" or monitor the frequency on the low power transceiver at a low duty cycle (to conserve power). If the malfunctioning tracking unit comes within communication range of an operational tracking unit (which continuously broadcasts ID requests to stranded units), the malfunctioning unit sends out its own ID and status. This information is passed on to the central station for data collection. Hence a solitary tracking unit with a malfunctioning power source, GPS receiver, satellite transmitter or antenna is still reported periodically whenever it passes a functioning tracking unit.

The ability to exchange the roles of master and slave among the tracking units provides transmission diversity which enhances link quality and received data integrity. This is benefical because one of the two tracking units (the one with the most fully charged batteries) could experience severe attenuation of its transmitted signal due to shadowing loss resulting from an obstruction in the line of sight to the satellite. Selecting between the two tracking units can mitigate this effect. Inclusion of more tracking units in the selection procedure improves link quality at the cost of averaging power over a large number of tracking units. Currently, the GPS function consumes the most power and, in this case, the transmission selection is restricted to two tracking units.

In order to employ the mutter mode, a protocol is provided which allows certain operations to occur. Among these operations are:

1. Forming a network from two or more independent tracking units and determining which unit is master of the network.
2. Maintaining a network with regular communication between master tracking unit and all slave tracking units.
3. Provision for removal of one or more tracking units from a network when they are moved out of range of communication with the master tracking unit.
4. Provision for addition of one or more tracking units to a network when they are brought into communication range with the master tracking unit.
5. Provision for merging of two or mote networks when the network master tracking units come within communication range of each other.

6. Provision for transferring the role of master tracking unit from a master unit with weak battery power to a slave unit with a stronger battery.

The above six operations must be performed in a manner that conserves battery power, which implies providing a minimal amount of transmitted data from any tracking unit and keeping the receiver of that tracking unit on for a very short time. These objectives must be met within realistic economic and technological constraints such as limited individual clock accuracy and a communication channel which has a finite error rate.

The mutter mode includes a report period during which all slave tracking units in a network communicate with the master unit of that network. Shorter report periods result in better time resolution of asset movements, while longer report periods use less power. The report period is divided into several sub-periods. Shorter sub-periods allow more message retransmissions for more reliability, while longer sub-periods promote fewer message "collisions" (i.e., interference between simultaneous messages) and allow handling of more assets per network. The local clock of each asset tracking unit is moderately accurate, having a short term relative clock accuracy measured over one report period and a long term absolute clock accuracy measured over several days. The long term clock accuracy is corrected during communications with the GPS satellite, or during any other tracking or communications in which the tracking unit is in periodic contact. Greater accuracy reduces system power consumption, while lesser accuracy lowers system hardware costs.

Messages sent between tracking units in the mutter mode include any preamble and synchronization bits, the data bits and error checking bits. A poll-acknowledge bit pair comprises a time slot, including all guard bands and turnaround times. Shorter transmission times reduce power consumption, while longer transmission times increase message transmission success rate. Tracking units can transmit and/or receive on two different channels. These channels may be different frequencies, or they may be different sequences in a PN (i.e., postive/negative) sequence spread spectrum code, and are identified as channel 1 and channel 2. In this protocol, it is also possible to use the same channel for all communications, but interfaces to protocols in other applications may make use of these two channels.

The communications actions of a tracking unit depend on what state or mode the tracking unit is in. A tracking unit may be in one of the following modes:

1. Autonomous Mode—A tracking unit communicates directly with the central station and is not networked to a mutter mode network.

2. Orphan Mode—A tracking unit is unable to communicate with the central station and is not networked to a mutter mode network. The central station does not have information about the current location of the orphan tracking unit and the orphan unit may or may not have such information.

3. Master Mode—The tracking unit communicates with the central station directly and is networked to other tracking units in the mutter mode so as to be responsible for transmitting information about the networked tracking units.

4. Slave Mode—The tracking unit does not communicate with the central station directly but is networked in a mutter mode and sends its sensor and, optionally, position information to a master tracking unit. The master tracking unit in turn transmits the slave tracking unit's information to the central station.

Figure 4:
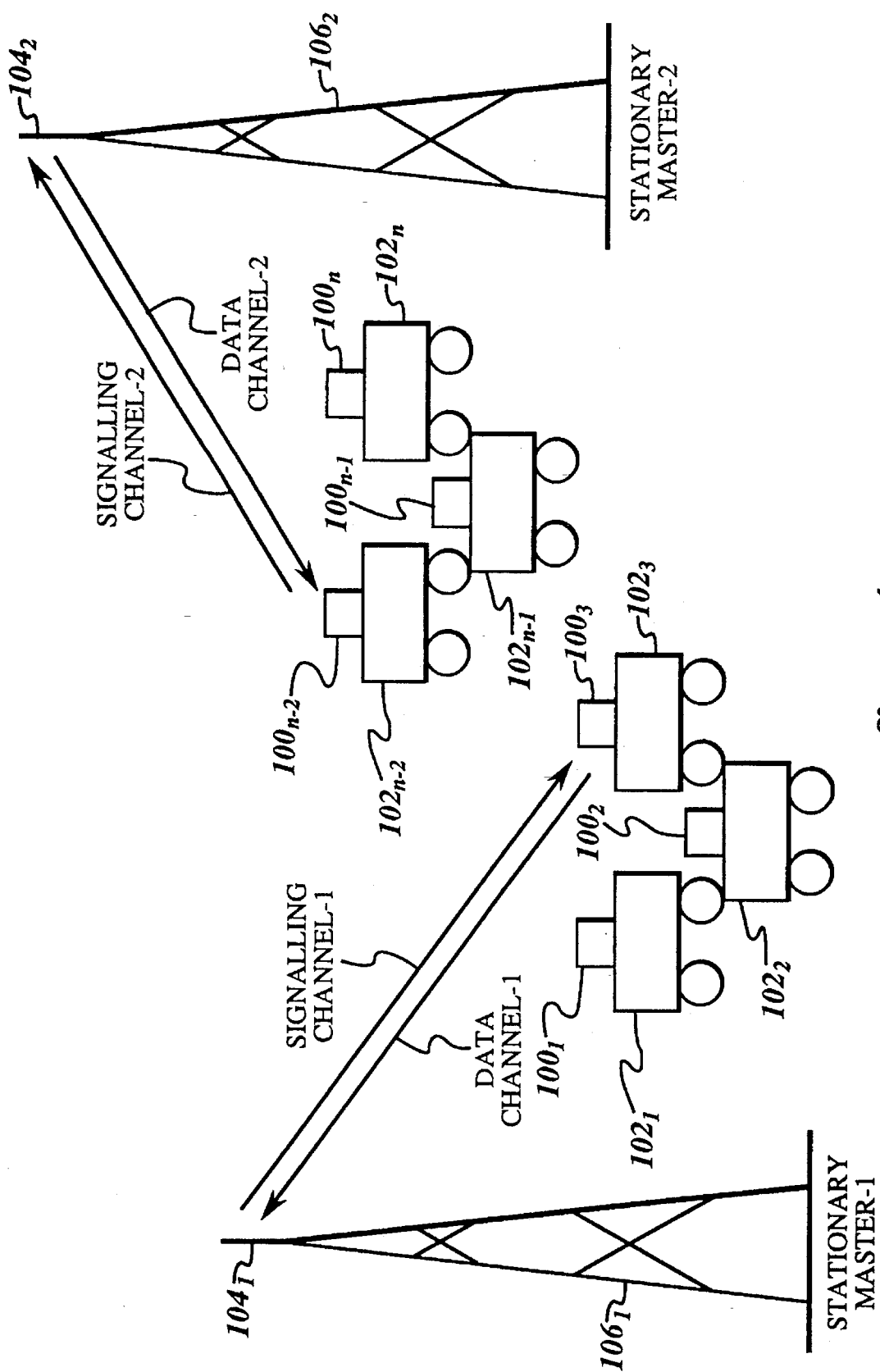
FIG. 4 is a block diagram illustrating the relation of one or more stationary master tracking units to mobile tracking units in a railway yard.

This invention is specifically applicable to the situation where there are high densities of mobile tracking units in a specific location for temporary periods. Typically, this situation exists in a railway yard where railcars are held on sidings awaiting removal from, or addition to, consists, before joining with a locomotive. FIG. 4 illustrates a railway yard having multiple tracking units $100_1, 100_2, \ldots, 100_n$, here attached to railcars $102_1, 102_2, \ldots, 102_n$, respectively. One or more stationary master units are provided in the yard to communicate with the mobile tracking units. In FIG. 4, two such stationary masters $104_1$ and $104_2$ are shown, each mounted on a respective tower $106_1$ and $106_2$. Each stationary master tracking unit is generally identical with the mobile tracking units shown in FIG. 2 except that a direct power source from the yard is provided.. Thus the battery power supply 62 with solar array 66 and charging circuit 64 are generally omitted except for those applications where optional battery backup may be required. Each master tracking unit communicates with the mobile tracking units in its own "mutter" network.

There may be need to employ multiple stationary master tracking units in a particular railway yard. For example, the railway yard may be too large for transmissions from one stationary master tracking unit to reach all of the mobile tracking units, or a single stationary master tracking unit may lack line-of-sight communication to all the mobile tracking units. To allow multiple master units to exist in the same location, a few, preferably three, different signalling and data channel pairs are provided. These channels, which do not interfere with each other, can be implemented by using different PN sequences for direct sequence spread spectrum transmissions by different stationary master units.

The preferred embodiments of the channel am in the ISM band of 902–928 MHz and use direct-sequence spread spectrum transmission. The data rate for communication is in the order of tens of Kbps (kilobits per second), a data rate of 19.2 kbps being preferred. Two channels are used for communication; a signalling channel for communication from the stationary master tracking unit to the mobile tracking units and a data channel for communication from the mobile tracking units to the stationary master tracking unit. On the signalling channel, the stationary master unit continuously, or periodically with high repetition rate, broadcasts a signal indicating its presence. The signal also contains other important information. A format for the information on the signalling channel is given below:

Frame

| SYNC | SMID | SM Loc | TIME | PKT-1 | PKT-2 | PKT-3 | | PKT-n | IDLE | SYNCH |
|------|------|--------|------|-------|-------|-------|---|-------|------|-------|

T

| SYNCH | F | MOBILE ADDR | C | MESG-1 | MESG-2 | MESG-3 | EC | F |
|-------|---|-------------|---|--------|--------|--------|----|----|

In the above format,

T is the time period for repetition of information in the signalling channel. This is implementation independent and is also the length of a frame.

SYNCH is the synchronization preamble to establish carrier synchronization and symbol boundaries.

SMID is the stationary master identification.

SM Loc is the stationary master location in latitude and longitude.

TIME is the time broadcast.

PKT-i is the packet addressed to any specific mobile tracking unit. There will be multiple packets addressed, respectively, to different mobile tracking units from unit 1 to unit n. All the information addressed to mobile tracking unit is included in PKT-i.

IDLE are bit stuffed zero bits if there is no more information to be transmitted in the frame.

The format of packets to mobile tracking units, as illustrated by PKT-2, is also shown above. If a critical message needs to be sent to a mobile tracking unit, for example an acknowledgement, it can be transmitted repetitively in the frame. The various fields of the packet are as follows.

SYNCH is the synchronization preamble to establish carrier synchronization and symbol boundaries. This field is included in each packet to enable the mobile tracking unit to quickly begin to decode information in the forward channel.

F is a flag. The first flag in the packet indicates the beginning of the packet, and the second flag indicates the end of the of the packet.

MOBILE ADDR is the address of the addressed mobile tracking unit.

C is a control field and contains information about the number of different data messages for the addressed mobile tracking unit and the total length of the message in bits.

MESG-j is the jth message to the addressed mobile tracking unit. The various messages to the mobile tracking units will include acknowledgements, commands for changing the operation mode of the mobile tracking unit, polled request for sensor information, etc.

EC is the error detection or detection and connection code formed over the MOBILE ADDR field through the MESG fields.

The data channel is used for communicating information from the mobile tracking units to the stationary master tracking unit. The information from the mobile tracking units to the stationary master tracking unit includes position reports, request to network with the stationary master tracking unit, preassigned data reporting and alarm sensor reports. The preferred mode of access to the data channel by the mobile tracking units is through random access. The protocol used the standard Aloha protocol as described by N. Abramson, "The Aloha System: Another Alternative for Computer Communications", *Proceedings of the Fall Joint Compute Conference AFIPS Conference* 37, 1970. Different PN sequences can be used by different mobile tracking units to further reduce the probability of message collisions. Acknowledgements are received by the mobile tracking units on the signalling channel. If a mobile tracking unit fails to receive an acknowledgement from the stationary master tracking unit within a predetermined time interval, it pauses for a random interval and then retransmits the data. The maximum number of transmit retries is limited. The format of the packets from mobile tracking units on the data channel is shown below:

| SYNCH | F | SMID | MOBILE ID | C | DATA | EC | F |
|---|---|---|---|---|---|---|---|
| | | | | | | | |

In the format above, MOBILE ID is the address of the source mobile tracking unit.

Figure 5:
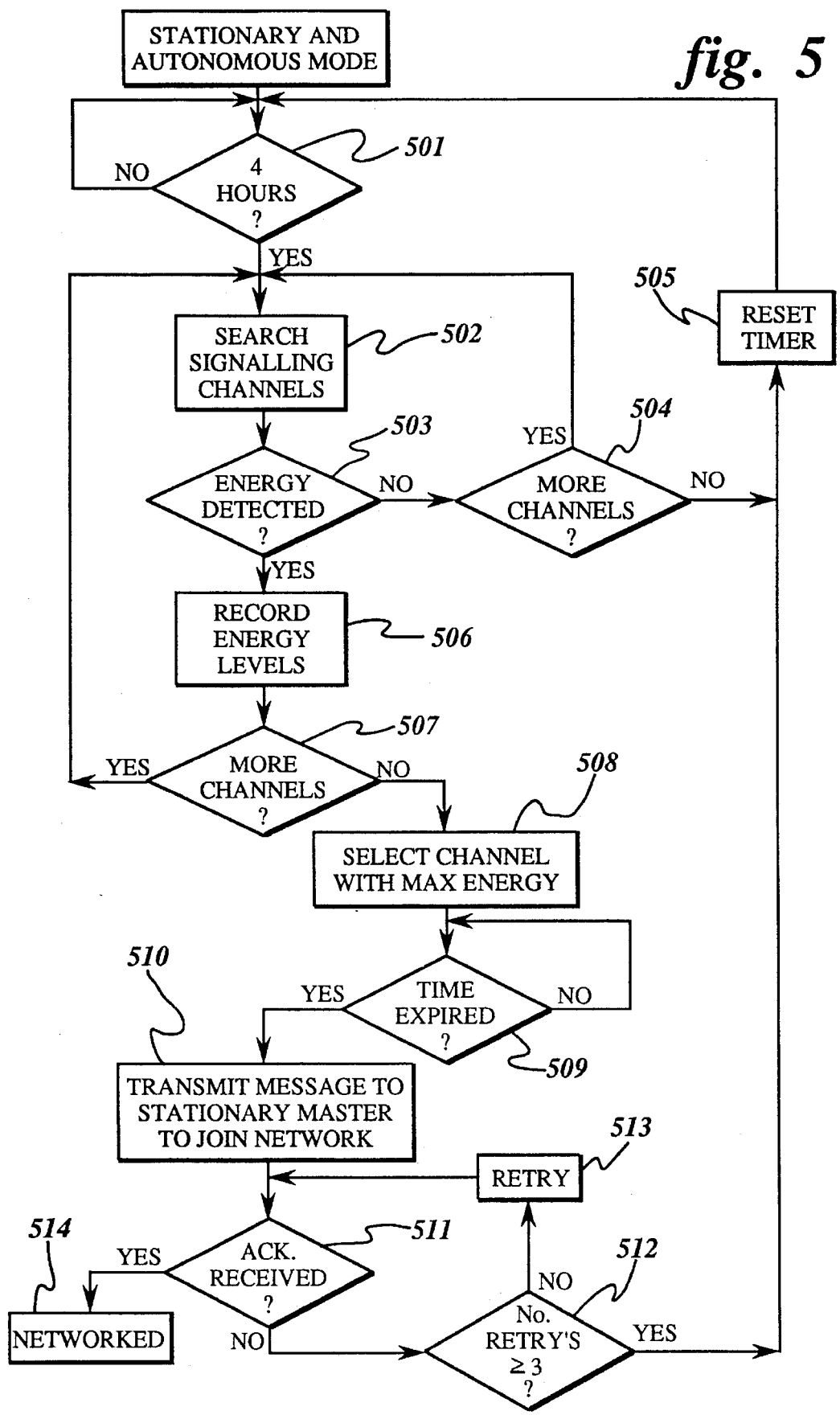
FIG. 5 is a flow diagram illustrating the functioning logic of the process of a mobile tracking unit joining a network having a stationary master tracking unit.

The process which a mobile tracking unit undergoes to join a network with a stationary master tracking unit is illustrated in FIG. 5. The process assumes that the mobile tracking unit is stationary and in the autonomous mode. In this mode, the mobile tracking unit is programmed to search for the signaling channels sequentially every four hours. Thus, when four hours has passed, as determined at step 501, a search is made of the signalling channels at step 502. A test is made at decision step 503 for each signalling channel searched for detection of energy. If energy is detected for any channel, a flag is set to indicate that energy has been detected for at least one channel. However, if energy is not detected for a channel and the flag is not set, a test is made at decision step 504 to determine if there are more channels to be searched. If so, the process loops back to step 502 to search the other channels. If after searching all channels, no channel with energy is detected (i.e., the flag has not been set), the time period is reset at step 505 before the mobile tracking unit goes into standby, or "sleep" mode until the next four hour period passes. On detecting energy in a signalling channel, the mobile tracking unit records the energy level at step 506. Then a test is made at decision step 507 to determine whether them are more channels to be searched. If so, the process loops back to step 502. Once energy has been detected in a channel, the flag is set so that this loop is repeated for each subsequent channel even though no energy is detected for a subsequent channel, in which event the energy level detected is simply entered as a null.

When all the channels have been searched, the mobile tracking unit selects the stationary master tracking unit corresponding to the signalling channel on which it detects the maximum energy at step 508. The mobile tracking unit pauses for a random amount of time at step 509 before it transmits a message to the stationary master tracking unit requesting to join the network at step 510. In the message, the mobile tracking unit may also include its current GPS position. The mobile tracking unit then monitors for a predetermined time, the forward signalling channel for an acknowledgement at decision step 511. If no acknowledgement is received on the forward signalling channel, the mobile tracking unit retries three times at random intervals, as indicated at decision step 512 and step 513. If the mobile tracking unit still does not receive an acknowledgement, it stays in the autonomous mode, and the process loops back to step 505 before the mobile tracking unit goes back into its standby or "sleep" mode. If the mobile tracking unit receives an acknowledgement, it changes its mode to networked at step 514. In the networked mode, a mobile tracking unit sends a message to the stationary master tracking unit at least once every four hours.

Either on request from the stationary master tracking unit or when a mobile tracking unit first enters a network, the mobile tracking unit transmits its coordinates or pseudo time differences and the GPS satellite identification it used to determine the coordinates to the stationary master tracking unit. If the mobile tracking unit performs reduced order GPS (ROGPS), it transmits only the time difference of arrival and the GPS satellite identification to the stationary master tracking unit which, in turn, performs differential GPS and transmits to the central station the location of the mobile tracking unit. If the mobile tracking units are equipped with full GPS capability, the stationary master tracking unit may also transmit the correction factors for all the satellites to allow the mobile tracking units to perform differential GPS.

For a mobile tracking unit to transmit a message to the stationary master tracking unit either on a periodic or exception basis, it pauses for a random amount of time and then transmits a message on the data channel. It then looks for an acknowledgement on the signalling channel for a predetermined time. If no acknowledgement is received, the mobile tracking unit goes back into its standby or "sleep" mode for a thirty minute interval. After thirty minutes, it again makes four attempts to communicate with the stationary master tracking unit and, if still not successful, changes to autonomous mode.

Figure 6:
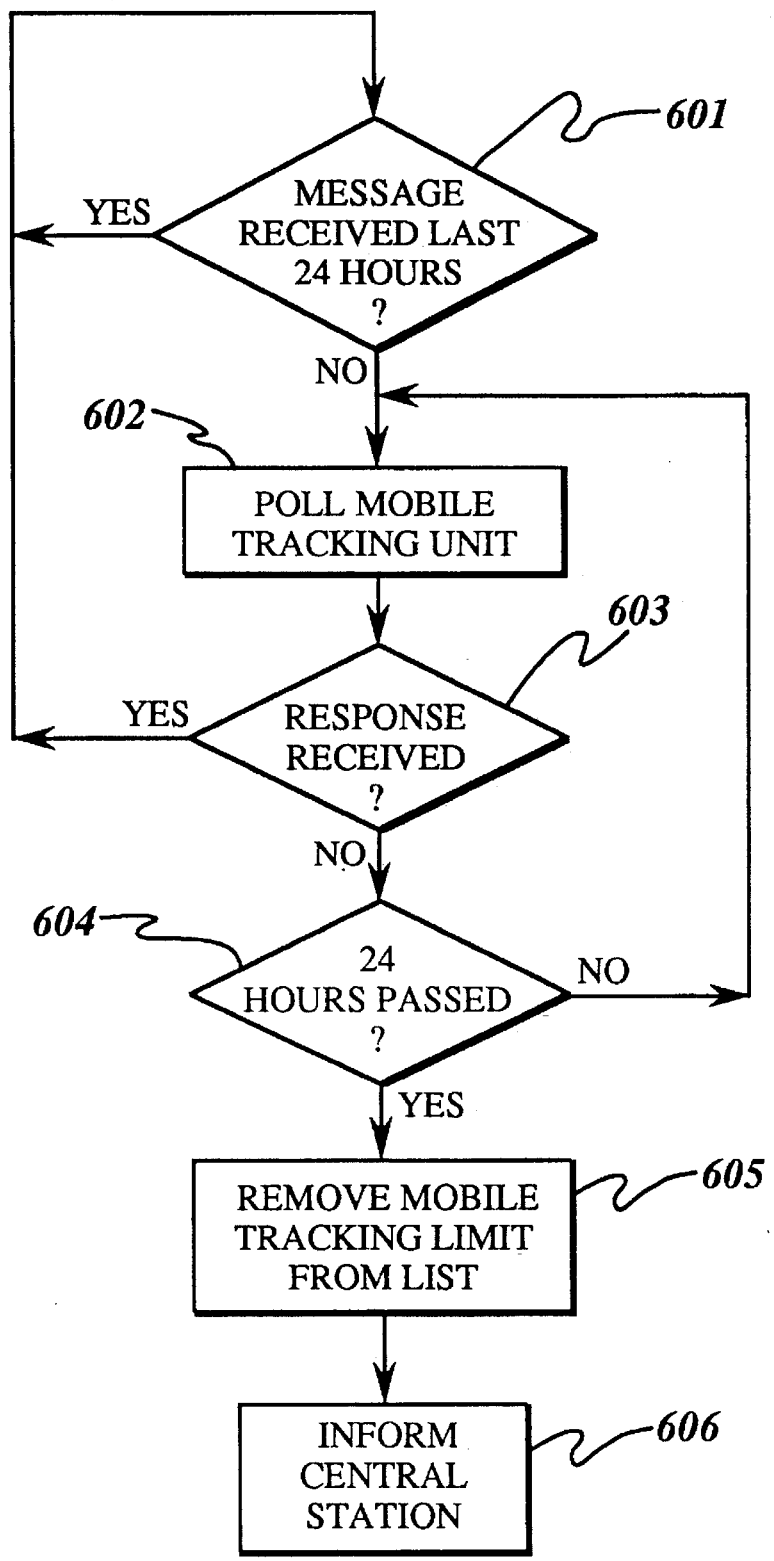
FIG. 6 is a flow diagram illustrating the functioning logic of the process of a mobile tracking unit leaving a network having a stationary master tracking unit.

The procedure which a mobile tracking unit undergoes in leaving a network is illustrated in FIG. 6. If a stationary master tracking unit receives no message from a networked mobile tracking unit for one day, as determined at step 601, the stationary master tracking unit transmits a poll to the mobile tracking unit at step 602. This poll is repeatedly transmitted on the forward channel either until the mobile tracking unit responds, as detected at decision step 603, or up to one day, as detected at decision step 604. If the mobile unit does not respond within a day, the stationary master tracking unit, on the assumption that the mobile tracking unit has left the railway yard, removes the mobile tracking unit from its list in the mutter network at step 605. The stationary master tracking unit informs the central station that it is unable to communicate with the mobile tracking unit, along with other information about the mobile tracking unit, at step 606.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A method of tracking mobile assets which are temporarily located in an area having a high density of mobile assets, comprising the steps of:

affixing a mobile tracking unit to each mobile asset to be tracked;

installing a stationary tracking unit in said area having a high density of mobile assets;

establishing a local area network of tracked assets between said stationary tracking unit and a plurality of tracking units affixed to mobile assets in close proximity in said area, each of said tracking units constituting a node of the mobile local area network, said stationary tracking unit being assigned to be a "master" unit and each of said mobile tracking units being a respective "slave" unit; and approximately locating assets by their respective connections in the local area network where location of the stationary tracking unit is known.

2. The method of tracking mobile assets which are temporarily located in an area having a high density of mobile assets as recited in claim 1 and further comprising the step of dynamically reconfiguring the local area network so that other mobile tracking units which enter said area can join the network, and other mobile tracking units which leave the area can exit the network.

3. The method of tracking mobile assets which are temporarily located in an area of a high density of mobile assets as recited in claim 2 and further comprising the steps of:

setting an autonomous mode for mobile tracking units entering said area and not being part of the local area network;

periodically searching signalling channels, by mobile tracking units in an autonomous mode, for signals from a stationary tracking unit; and adding each autonomous mode mobile tracking unit for which signals from a stationary tracking unit are detected, to a local area network.

4. The method of tracking mobile assets which are temporarily located in an area having a high density of mobile assets as recited in claim 3 wherein the step of adding each autonomous mode mobile tracking unit for which signals from a stationary tracking unit are detected, to the local area network comprises the steps of:

transmitting a message by said each autonomous mode mobile tracking unit to the stationary tracking unit to join the network;

detecting by said each autonomous mode mobile tracking unit an acknowledgement from said stationary tracking unit; and changing the mode of said each autonomous mode mobile tracking unit to networked.

5. The method of tracking mobile assets which are temporarily located in an area having a high density of mobile assets as recited in claim 2 and further comprising the steps of:

periodically receiving transmissions from mobile tracking units in the local area network by said stationary tracking unit;

polling by the stationary tracking unit each mobile tracking unit for which a transmission has not been received for a predetermined period of time; and removing from the network by the stationary tracking unit each polled mobile tracking unit for which no response to the polling has been received.

6. The method of tracking mobile assets which are temporarily located in an area having a high density of mobile assets as recited in claim 5 further comprising the step of transmitting to a central station by the stationary tracking unit information that each polled mobile tracking unit for which no response to the polling has been received has been removed from the network.

7. The method of tracking mobile assets which are temporarily located in an area having a high density of mobile assets as recited in claim 5 further comprising the step of repeating the polling step for a plurality of times in a predetermined interval before the step of removing from the network each polled mobile tracking unit for which no response to the polling has been received.

* * * * *